United States Patent [19]
Puckett, Jr. et al.

[11] 3,786,482
[45] Jan. 15, 1974

[54] APPARATUS FOR GENERATING AND DISPLAYING CHARACTERS BY TRACING CONTINUOUS STROKES

[75] Inventors: Jason N. Puckett, Jr., Los Angeles; Stephen L. Kurtin, Sherman Oaks; Arnold J. Goldman, Encino, all of Calif.

[73] Assignee: Lexitron Corporation, Chatsworth, Calif.

[22] Filed: Mar. 13, 1972

[21] Appl. No.: 234,040

[52] U.S. Cl. .............................. 340/324 A, 315/18
[51] Int. Cl. .............................. G06f 3/14
[58] Field of Search .............................. 340/324 A; 235/197, 235/198; 315/18

[56] References Cited

UNITED STATES PATENTS

| | | | |
|---|---|---|---|
| 3,597,757 | 8/1971 | Vincent-Carrefour et al. | 340/324 A |
| 3,569,951 | 3/1971 | Lavenir | 340/324 A |
| 3,510,865 | 5/1970 | Callahan et al. | 340/324 A |
| 3,587,083 | 6/1971 | Tubinis | 340/324 A |
| 3,691,551 | 9/1972 | Kashio | 340/324 A |
| 3,500,332 | 3/1970 | Vosbury | 340/324 A |

*Primary Examiner*—John W. Caldwell
*Assistant Examiner*—Marshall M. Curtis
*Attorney*—John G. Mesaros

[57] ABSTRACT

A character display system for tracing a succession of strokes on a display tube to thereby generate the character. The digital information necessary to generate the proper number of strokes in the correct sequence is stored in a character read-only memory, each location of which provides memory words of 16 bits, one or more portions of each memory word being latched into one or more data registers at predetermined time intervals after the memory word is available. A multiplexer is provided to route the correct bit from the memory or the one or more registers to each of the six multiplexer outputs to create control words of six bits. Control logic is provided to respond to the control words to generate digital signals for selectively incrementally charging two capacitors to control the vertical and horizontal deflection fields respectively of the display tube. The charging of each capacitor is accomplished by combinations of whole and fractional units of positive charging current above a predetermined negative level to provide the appropriate analog signals for the deflection circuitry. The control word also controls the unblanking amplifier of the cathode ray tube circuitry.

A control read-only memory is provided to accept information indicative of the character and provide outputs indicative of the number of strokes required for that particular character and memory address information for the character read-only memory.

11 Claims, 12 Drawing Figures

APPARATUS FOR GENERATING AND DISPLAYING CHARACTERS BY TRACING CONTINUOUS STROKES

BACKGROUND OF THE INVENTION

1. Field of the Invention

This invention relates to a character display system and more particularly to a character generating apparatus of the type which traces a character on a display surface by generating in proper sequence a string of strokes or vectors in a continuous sequential fashion to form the character.

2. Description of the Prior Art

Prior art apparatus for the generation of characters on a display surface such as a cathode ray tube or XY recorder paper utilize several known methods such as a dot matrix, starburst or stroke generation. With a dot matrix technique, all possible elements of a character must be addressed in order to eliminate the particular dots creating the particular character. In the starburst stroke pattern generation the characters formed are created by selective energization of a proper combination of each of sixteen possible character segments arranged in a somewhat rectangular array. This particular method, however, has its drawbacks by the creation of artificial font of a generally block-like nature.

Of the various methods stroke generation has the greatest possibility for creating characters of high quality by tracing a particular character by a succession of continuous strokes, each in the proper direction, to form the character, much like one forms a character by printing or writing for example. However, with the current state of the art, stroke system's block-like characters are formed because of the limited number of strokes available to form the particular character. If an increase in the number of strokes available is desired, the system complexity and cost correspondingly increase, generally in a manner disproportionate to the improvement and the end result achieved. Furthermore, the increase in the number of strokes available is generally limited by the speed of the memory containing the information necessary to control the deflection circuitry of the cathode ray tube on which the character is to be displayed. In such systems the information necessary to generate particular characters is dependent upon character complexity, for example, a dash requires less information than the character "%". This is due to the fact that in the first case only one direction is necessary to paint the stroke and the electron beam to paint the stroke must only go through one on-off cycle while in the latter case compound curves must be created in various directions and the electron beam must go through at least two on-off cycles. However, even though the information required for the latter case is much greater than that required in the former case, the storage region in such systems must be large enough to store the information for the longest character to be displayed for each and every character, thus resulting in wasted storage. Consequently, in order to keep the size of the memory down to a reasonable amount of storage as well as cost, shortcuts are taken by providing characters of a few strokes as possible.

In addition, in prior art systems of this type, the deflection circuitry of a display tube requires analog signals which are to be controlled in some fashion by digital information, thereby necessitating digital to analog converters or ramp generators and summing amplifiers to provide the necessary analog signals.

SUMMARY OF THE INVENTION

Accordingly, it is an object of this invention to provide a new and improved display system employing stroke generation techniques.

It is another object of the invention to provide a new an improved display system which smoothly creates the character to be displayed utilizing stroke generation techniques.

It is a further object of this invention to provide a new and improved display system having a variable number of strokes per character depending upon character complexity.

It is still another object of this invention to provide a character generator with extremely efficient usage of the memory used to store the information required to form the characters.

It is a still further object of this invention to provide a new and improved display system utilizing multiplexing techniques to provide control words at a faster rate than words from the memory containing the character information.

It is a still further object of this invention to provide a new and improved display system with a subsystem which directly converts a digital bit stream into continuous analog signals for control of the deflection circuitry.

It is still a further object of this invention to provide a new and improved character generator capable of creating a large repertoire of characters of extremely high resolution.

The foregoing and other objects of the invention are accomplished by providing a character read-only memory wherein each memory location contains sufficient information to generate a sequence of control signals, the information from the memory having one or more portions thereof latched into one or more data registers at predetermined time intervals after the code from the memory is available. A multiplexer is provided to route the correct bit from the memory or one of the registers to each of six multiplexer outputs to create the control signals. The character read-only memory is addressed by an address counter which receives input from a second read-only memory which contains information relating to the number of control words for a particular character as well as the starting memory address for that character. The second read-only memory is inputted by external means such as a keyboard encoder or the like. By storing the starting memory address and number of control words in a comparatively small control read-only memory, unusually high density storage in a larger and more expensive character read-only memory is effected.

On the output side, the control words are latched in and employed by control logic to direct the turning on and off of current sources which create a controlled analog time-varying voltage on each of two capacitors to thereby control the deflection circuitry by direct conversion of a digital bit stream into continuous analog signals corresponding to the character to be displayed.

DESCRIPTION OF THE DRAWINGS

Further objects, features and advantages of the invention can be had with reference to the accompanying specification when taken in conjunction with the drawings, in which.

DESCRIPTION OF THE PREFERRED EMBODIMENT

Figures 1, 2:
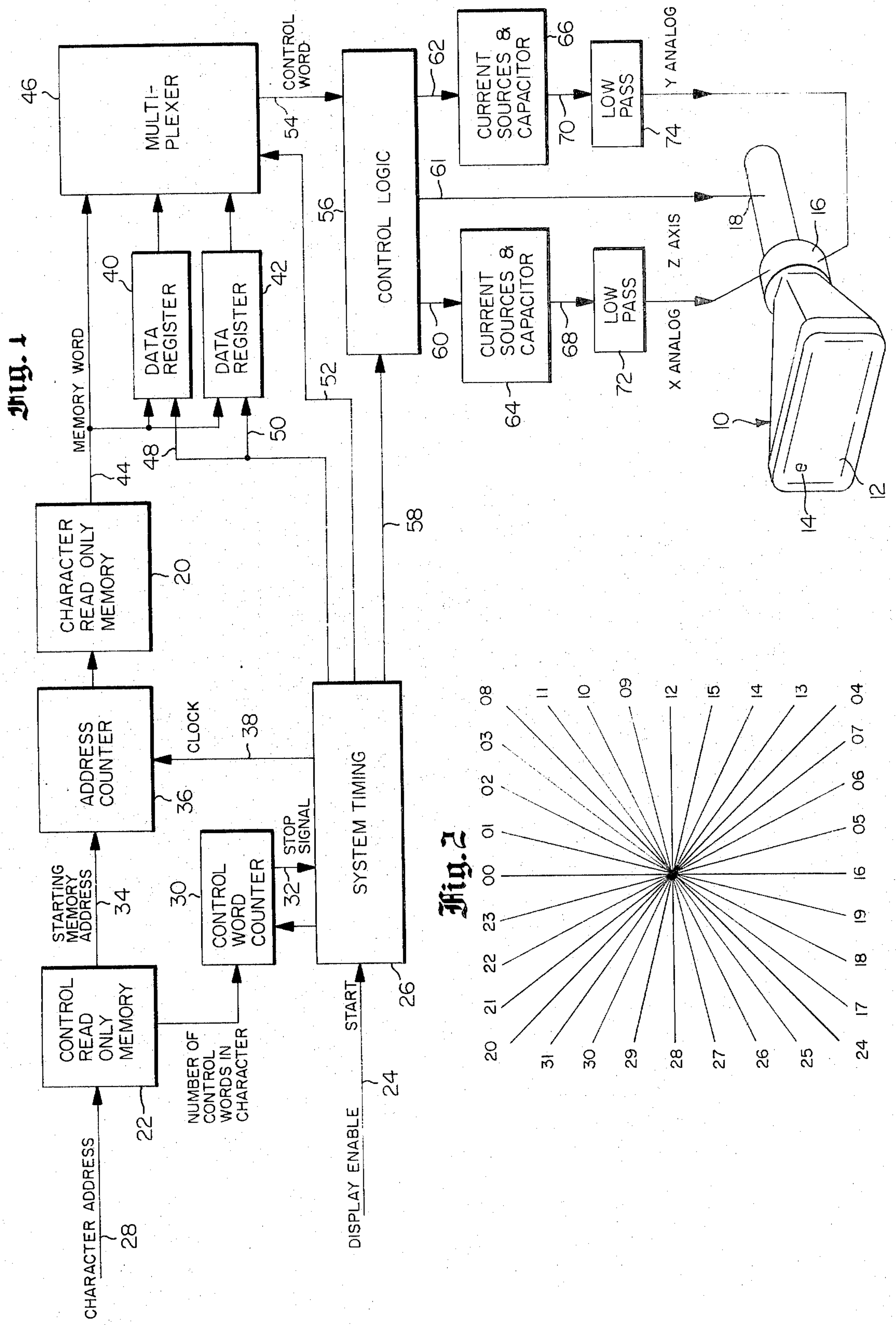
FIG. 1 is a block diagram of a character display system according to the invention.
FIG. 2 is a diagram of vector directions possible in the apparatus of FIG. 1.

Referring now to the drawings and particularly to FIG. 1, there is shown a block diagram of a character generator according to the invention including a display tube 10 having a display surface 12 on which a character such as the letter *e* 14 is to be displayed. The cathode ray 10 has suitable X–Y deflection circuitry 16 for deflecting the electron beam to generate the character 14 as well as Z axis control at 18, that is, for blanking and unblanking signals for producing a visible trace on the surface 12 at points thereon corresponding to the positions of the electron beam with the trace persisting as long as the unblanking signal is present. Although the invention herein is illustrated with respect to a cathode ray tube surface, it is to be understood that the invention is also applicable to other display means such as an X–Y plotter or the like.

The X, Y, and Z signals for the cathode ray tube 10 are generated by the apparatus shown in FIG. 1 which develops a succession of strokes having predetermined directions, the strokes being traced in proper sequence to generate the particular character. The strokes so traced are variable in length and are limited in time duration only. In the particular embodiment to be hereinafter described the apparatus shown is capable of generating characters having a minimum of eight strokes necessary to form the character and a maximum having as many as fifty-four strokes necessary to form the character. It is to be understood, however, that although the embodiment to be described operates within this range of strokes for the characters to be displayed, far more complicated characters can be displayed, the only limitation being the storage space available in the character read-only memory 20 with virtually no limitation imposed by the speed of the character read-only memory 20.

To effect this, the character read-only memory 20 stores only the information necessary to generate the character while a second read-only memory 22 is provided for control purposes. Furthermore, each address in the character read-only memory 20 contains information sufficient to generate a plurality of control words to actuate the deflection circuitry 16 to generate a similar number of strokes on the display surface 12 of the display tube 10.

To operate the system two external signals are required, the first being a display enable signal 24 which provides a start pulse to the system timing 26 which start pulse is then locked in to the first master clock signal occurring after initiation of the "display enable" signal 24 to generate a "count enable" signal. A second signal corresponding to the information required for the character is generated by an external device such as keyboard encoder which delivers a character address signal 28 to the second read-only memory 22. The information stored in the control read-only memory 22 is then fed out in two groups of data, one group being indicative of the number of control words in the character with data sent to the control word counter 30. Each control word corresponds to one stroke direction of the series of strokes necessary to generate the particular character as well as information controlling the energization state of the electron beam. The control word counter 30 can be a countdown counter or a countup counter if the information corresponding to the number of control words is in complementary form. In either event, after the count reaches the proper number of control words, a stop signal 32 is initiated and transmitted to the system timing 26 to designate the end for that particular character. The other group of data fed out of the control read-only memory 22 corresponds to the starting memory address signals 34 which actuate an address counter 36 which is suitably synchronized by a clock signal 38 from the system timing 26. The address counter 36 then provides the necessary information to address the proper locations in character read-only memory 20 in sequential fashion. Each storage location in the character read-only memory 20 contains a memory word which may be, for example, sixteen bits of information. The control word, however, in the example to be hereinafter described, consists of only six bits of information with the control words being produced several times faster than memory words. In order to accomplish this result, a first data register 40 and a second data register 42 are provided. At a first predetermined time interval after the memory word is available on line 44 of the output of character read-only memory 20 certain bits of the word are latched into data register 40 and at a second predetermined time interval certain other bits of the word are latched into data register 42. The outputs of the character read-only memory 20 and the data registers 40 and 42 are connected to a multiplexer 46. The data registers 40 and 42 and multiplexer 46 receive the necessary clock signals from the system timing 26 by means of lines 48, 50 and 52 respectively to effect the proper sequencing and time control. The control word output 54 from the multiplexer 46 consists of a series of control words having six bits of information per word. Therefore it is necessary to convert the 16 bit memory words to a six bit control words by means of the multiplexer 46. This is accomplished by latching the proper memory bits into the respective data register 40 or 42 so that the necessary data for creating each successive control word will be available from the memory or one of the registers.

The control word at output 54 than actuates suitable control logic 56 which is suitably clocked from system timing 26 by line 58. The most significant bit of a control word controls the Z axis output 60 while the other five bits of the control word provide two outputs of four logic lines each in digital form at outputs 60 and 62 for the X axis deflection and Y axis deflection respectively. Each of these outputs 60 and 62 then suitably actuate current sources and capacitors 64 and 66 respectively which directly convert the digital bit streams outputs at 68 and 70 respectively to continuous analog signals which are then low pass filtered at filters 72 and 74 respectively to provide the necessary analog signals to the deflection circuitry 16.

Figure 4:
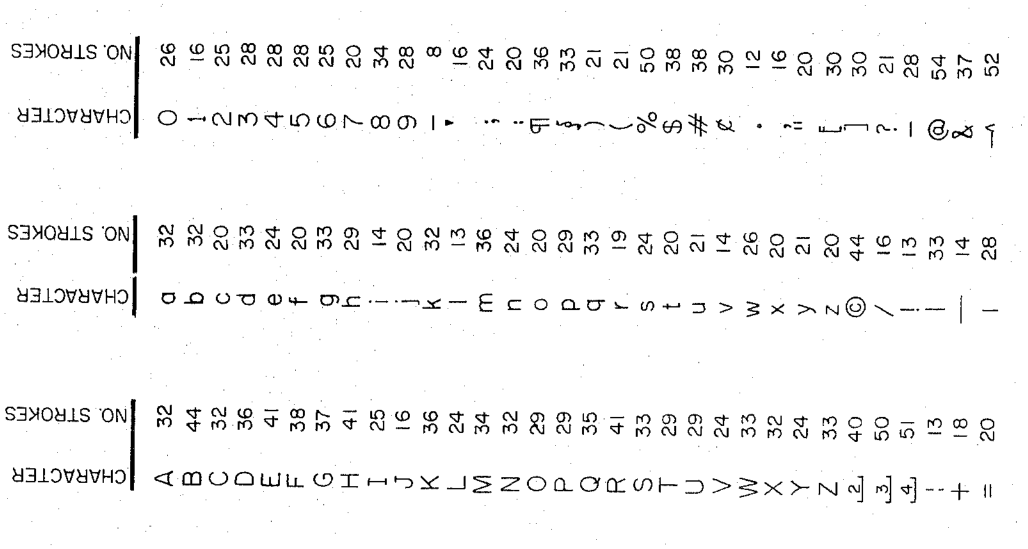
FIG. 4 is a table of characters and the strokes employed to create the character.
Figure 3:
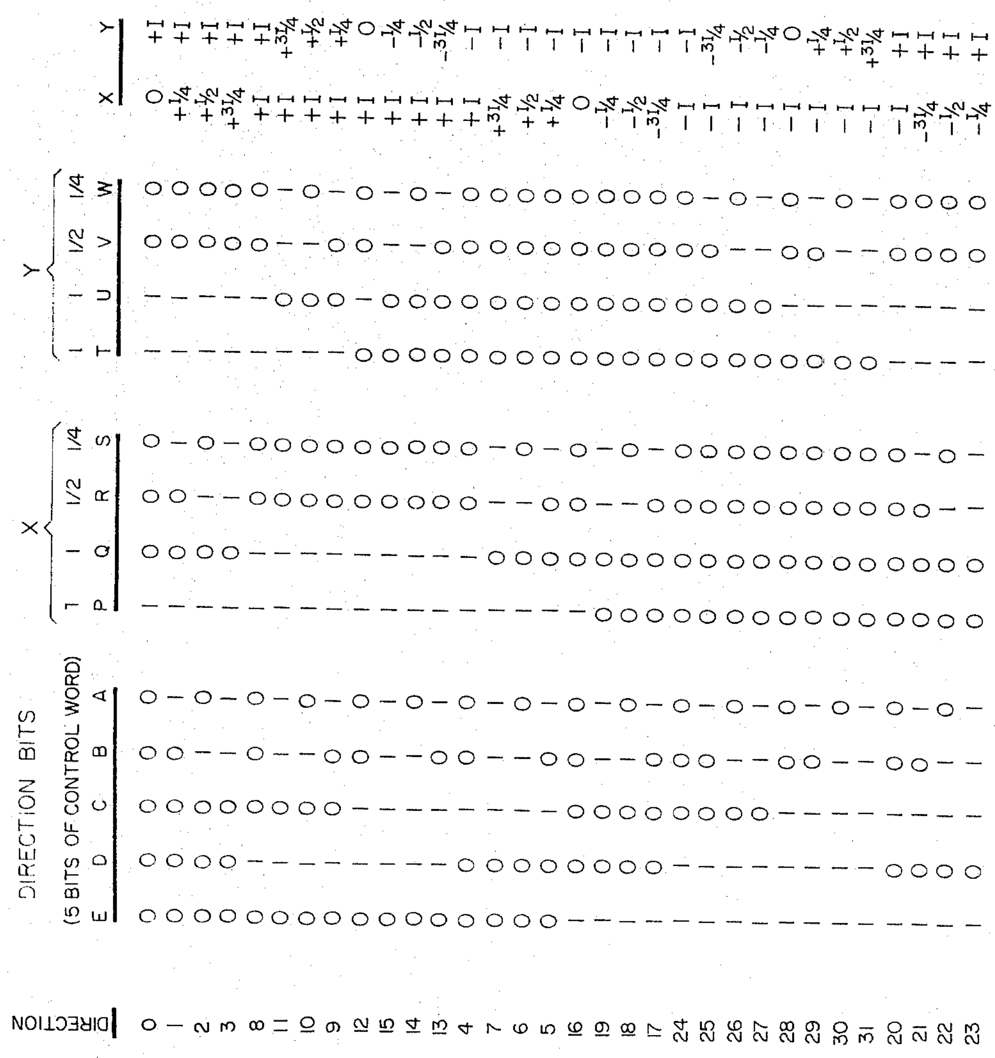
FIG. 3 is a table of vector directions, digital information and resulting analog values.

The function of each of the blocks of FIG. 1 will be discussed in detail hereinafter with reference to system timing as well as by example for generation of a given character. To better illustrate the operation of the apparatus of FIG. 1, reference is made by way of example to FIGS. 2, 3 and 4 wherein, briefly, FIG. 2 illustrates 32 stroke directions employed in the apparatus of FIG. 1; FIG. 3 illustrates a table of code assignments by direction number assigned to the vectors of FIG. 2, the five bit code assignment forming a part of the six bit control word which actuates the control logic 56, the four bit code assignments for the X and Y axes respectively which is the output of the control logic 56 at outputs 60 and 62, respectively, and the X and Y current analog values corresponding to the X and Y digital assignments. FIG. 4 is representative of a typical character repertoire usable in the present invention with a listing of the number of stroke directions necessary to generate each of the particular characters illustrated thereon. For purposes of explanation, each of the vector directions of FIG. 2 is assigned a decimal notation, such as the number 12 being assigned to the vector having a horizontal direction to the right as viewed in FIG. 2. Each of these decimal designations has a corresponding five bit binary number equivalent thereto which, as shown in FIG. 3, is the five bit assignment corresponding to a decimal equivalent. For example, when reading the table of FIG. 3, going down the left-hand column entitled "Direction" to the number 12, it can be seen that the digital notation is 01100, which is the binary equivalent. This particular digital assignment holds true for all 32 vector directions and was selected for design convenience and not intended to be a design limitation. The digital assignments are labelled E, D, C, B, A, with the column entitled "E" being the most significant bit of the five bit sequence while the column entitled "A" is the least significant bit. It is also to be understood that in the actual control word a sixth column is present to the left of the E column which would be the information bit for the Z axis which would be the most significant bit for the control word. In the example to be illustrated, the Z axis bit is merely an on-off control of the electron beam for controlling the tracings of the strokes on the display surface.

For a given stroke direction the six bit control word, that is, the five bits shown in the table plus the bit indicative of the on-off state of the Z axis, would be fed into the control logic 56 whereupon the direction bits E, D, C, B, A would generate from the control logic 56 the two four bit words corresponding thereto labelled in FIG. 3 as P, Q, R, S and T, U, V, W for the columns labelled X and Y, respectively, to control the deflection circuitry 16. It is noted herein that each of the bit columns P, Q, R, S and T, U, V, W have numerals 1, one-half or one-fourth immediately thereabove, the significance of which will be discussed hereinafter along with the significance of the last two columns entitled X and Y.

As shown in FIG. 4, the character repertoire generated by the apparatus of FIG. 1 varies in the number of strokes necessary to create the particular character from a minimum of eight strokes necessary to create the symbol "-" to a maximum of 54 strokes necessary to generate the symbol "@". This corresponds respectively to 48 bits of information necessary to generate the simplest character in the repertoire to 324 bits of information necessary to create the most complex at six bits of control word per stroke. In the particular choice of symbols shown in the table of FIG. 4, the average number of bits per character is approximately 167 with approximately one hundred characters thereby necessitating storage space of approximately seventeen thousand bits of information assuming 100 percent efficiency.

In the prior art systems the amount of storage would be determined by the most complex character to be displayed and in the illustration given this would correspond to 324 bits of information times approximately 100 characters, thereby requiring approximately 32,000 bits of information storage space. This would be so because the amount of storage per character would be dependent upon the most complex character to be displayed. In the present invention, extremely high efficiency of the character read-only memory 20 is achieved by utilizing the character read-only memory 20 for character information only while providing a control read-only memory 22 (which is generally smaller and less expensive) for control purposes. Furthermore, approximately 99 percent of the character read-only memory locations are used by providing 16 bit memory words which contain sufficient information for 2 and ⅔ control words. The specifics of this arrangement will be discussed hereinafter with respect to the timing diagrams.

Figures 5, 6:
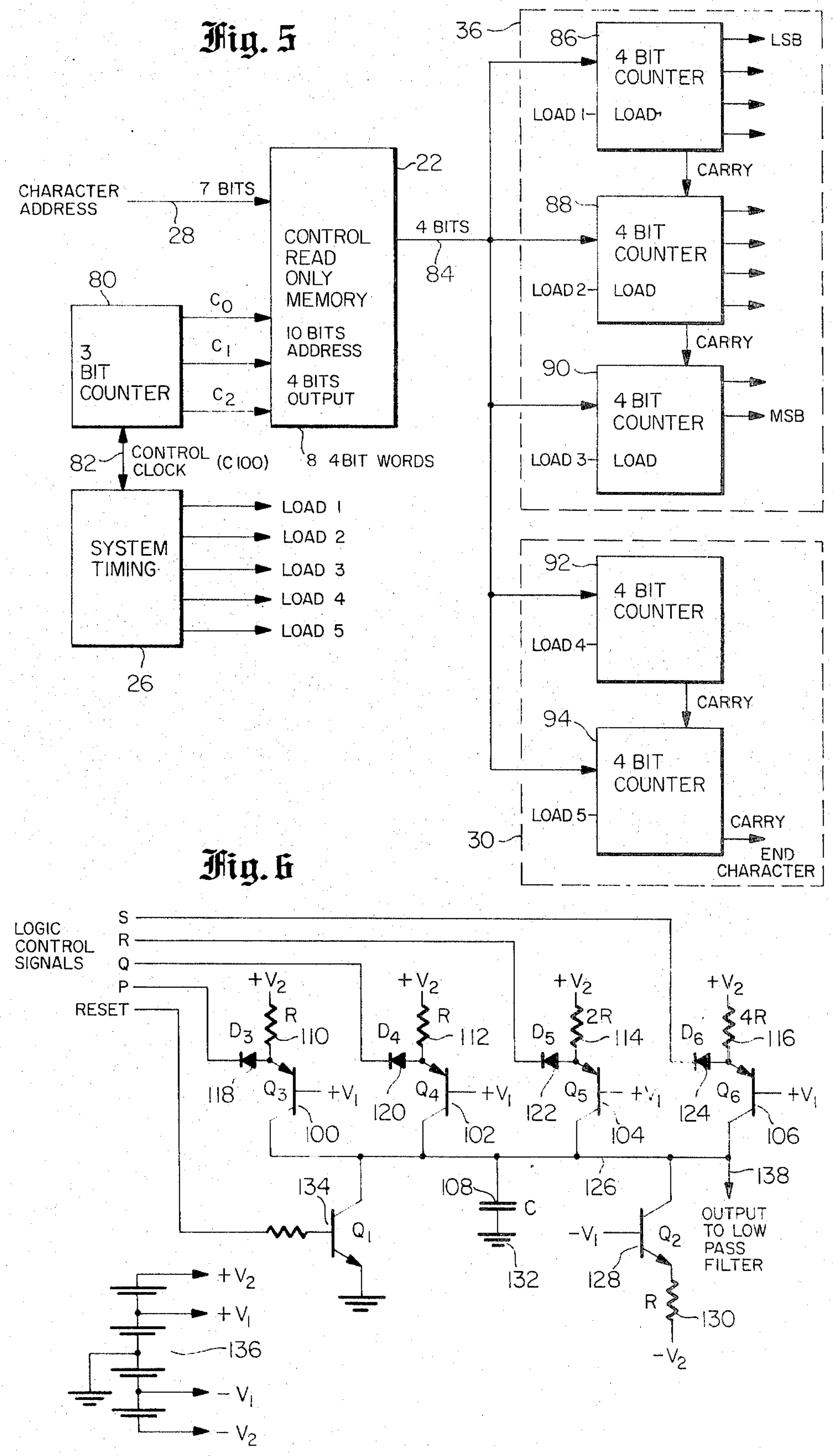
FIG. 5 is a block diagram showing a modified form of the input stages of the system of FIG. 1.
FIG. 6 is a schematic diagram of the current sources and capacitor used in the FIG. 1 system.

Referring now to FIG. 5, there is shown a modification to the control read-only memory 22, the control word counter 30 and the address counter 36 of FIG. 1. In the modification of FIG. 5, the control read-only memory 22 is a four bit wide memory to which inputs are provided from the external keyboard system at line 28 to provide character address information of seven bits, for example, coded in the format of USASCII. The memory 22 also receives inputs from the three bit counter 80 which receives control clock signals 82 from the system timing 26. With the seven bits of information available from the character address plus the three bits available from the three bit counter 80 a 10 bit address is provided to the control read-only memory 22 which supplies four bits of data for each unique 10 bit address. The character address data is of sufficient duration for the three bit counter 80 to assume its eight possible states (i.e., $C_0={}_0$ or 1, $C_1$ 32 O or 1, $C_2$=O or 1). By this method it is possible to create eight unique ten bit addresses for a given seven bit character address. For each unique 10 bit address four bits of data at output 84 of read-out memory 22 are supplied to the pre-settable inputs of five four bit counters 86, 88, 90, 92 and 94. Each of these counters is gated by suitable load signals from the system timing 26 identified as "load 1", "load 2", etc. (For the timing of the "load" gates, see FIG. 7). For a given character address, the first block of four bits at output 84 is loaded into the first counter 86 when "load 1" goes low to provide the enabling signal. The control clock signal 82 then advances the three bit counter 80 to address the next block of four bits to output 84 which is then loaded into the second counter 88 on "load 2." The control clock signal 82 then advances the three bit counter to address the next block of four bits onto output 84 with the third and fourth bits of the third block being "O" since only ten bits of information are utilized in the address counter. The next two blocks of four bits which are sequentially addressed as the control clock signal 82 advances the three bit counter 80 through the next two states are likewise loaded into counter 92 on "load 4" and counter 94 on "load 5". The eight bits of information to counters 92 and 94 provide information indicative of the number of control words necessary to form the particular character. In this particular modification the control read-only memory 22 is not efficiently used but it permits efficient use of the character read-only memory 44 which is generally larger and more expensive.

Referring now to FIG. 6, the details of the current sources and capacitor 64 and 66 will be discussed. Each of these current source circuits is identical in configuration and a description hereinafter will proceed on the basis of the X-axis deflection. The four inputs S, R, Q and P on the circuit of FIG. 6 correspond to the input 60 to the current source circuit 64 of FIG. 1. Four current switches are provided by transistors 100, 102, 104 and 106, each of which is connected in a grounded base configuration with the emitters coupled to selectively provide charging current to a charging capacitor 108. The bases of each of the transistors are suitably coupled to a positive voltage source $+V_1$ while the emitters are suitably biased to a second positive voltage source $+V_2$ where $V_2$ is greater than $V_1$. Each of the emitters is connected to its respective voltage source through a current limiting resistor, the value of which determines the amount of charging current to capacitor 108. The value for resistors 110 and 112 in series with the emitters for transistors 100 and 102 respectively are set at a unit value R while resistor 114 in series with the emitter transistor 104 has a value double that, or 2R while resistor 116 connected in series with the emitter of transistor 106 has a value of 4R (i.e., four times the resistance of resistors 110 or 112). The emitter of each transistor 100, 102, 104 and 106 has the anode of a diode 118, 120, 122 and 124, respectively, connected thereto while the cathode of each diode receives the input signal P, Q, R and S, respectively. The common connection 126 of the collectors of the switching transistors is connected to the collector of transistor 128 having the base thereof connected to the negative voltage source $-V_1$ and the emitter connected to a negative voltage source $-V_2$ through a resistor 130 of unit value (equivalent resistance to resistor 110). Here again $V_2$ is greater than $V_1$, that is, more negative. Transistor 128 is an NPN transistor while transistors 100, 102, 104 and 106 are PNP transistors. It should also be noted that capacitor 108 has one end thereof connected to line 126 while the other end is connected to ground 132 with a transistor switch 134 connected in parallel with capacitor 108. Transistor 134 has the collector thereof connected to common line 126 while the emitter thereof is connected to ground 132 while the base thereof provides an input signal termed "reset" for switching transistor 134 to the conductive state when the "reset" signal is present.

The voltages for the circuit are provided from a suitable voltage source 136. The output of a current source circuit is taken from line 126 as indicated by arrow 138 (which is equivalent to line 68 on FIG. 1 to low pass filter 72).

In the operation of the circuit of FIG. 6 transistor 128 is biased to be continually conductive and provide a constant current of negative polarity to the capacitor 108 so that the initial charge on capacitor 108 is provided by negative net current. This negative net current has a value of $-I$ (that is, negative one unit of current). Resistors 110 and 112 are established at a unit resistance value, equivalent to the resistance of resistor 130 with the voltage $V_2$ having the same magnitude whether positive or negative. As a result, when current is properly switched through transistor 100 or 102, the current will have a unit value, that is, $+I$. Similarly, the current passing through transistor 104 will have a value $-1/2I$ since the resistor 114 has a two unit value of resistance, and the current through transistor 106 will be $-1/4I$ since the resistor 116 has a resistive value of four units. These current values correlate with the designation shown in FIG. 3 immediately above the input signal columns P, Q, R and S. In the initial condition with no logic signals at the input terminals of switching transistors 100, 102, 104 and 106 the diodes 118, 120, 122 and 124 respectively are forward biased and the base-emitter junction of each of the transistors is reverse biased (base voltage greater than emitter voltage) so that the current flow from the collectors is zero. However, initially the capacitor 108 has a negative constant charging current of one unit of current from transistor 128. If a logic control signal is applied at P to the cathode of diode 118 and the logic control signal is high i.e., greater than $+1$, then diode 118 is reverse biased and carries no current. Transistor 100 then has an emitter current, the value of which is determined by the value of the resistor 110 and the value of the voltages $+V_1$ and $+V_2$ and the base-emitter voltage of transistor 100. The net result is a positive charging current of one unit ($+I$) which offsets the negative charging current of transistor 128 to bring the output at 138 to zero. Similarly, if logic control signals are applied to inputs Q, R and S the respective charging currents will be $+I$, $+1/2I$, and $+1/4I$. By the utilization of the particular circuit arrangement, the current from each device may be switched to zero or to a fixed value. The transistors 100, 102, 104 and 106 are identical and chosen to have a high current gain in order that the emitter current merely flows out the collector and into capacitor 108 virtually undiminished. Furthermore, the grounded base configuration was selected so that only the emitter current is switched. This mode of operation permits extremely rapid current switching. Also, the use of the negative constant current source of transistor 128 permits analog current values of zero, + or $-1/4I$, + or $-1/2I$ and + or $-I$. The X and Y analog values of current combinations are shown in the last two columns of the table of FIG. 3. For example, assuming the direction 12 of FIG. 2, the digital information to the current source circuit inputs P-Q-R-S- is 1100 resulting in logic controls signals to the P input and Q input with zero signals at the R input and S input. This would result in a charging current on the X-axis of the deflection circuitry of $+2I-I$ resulting in a net charging current of $+I$ as shown in the next-to-the-last column (labelled X) of FIG. 3.

The control circuit of FIG. 6 also receives a "reset" signal subsequent to the application of each sequence of logic control signals, the "reset" signal being applied to the base of transistor 134 switching transistor 134 to its conductive state to thereby discharging capacitor 108 at the end of the character display cycle.

Figures 7, 9:
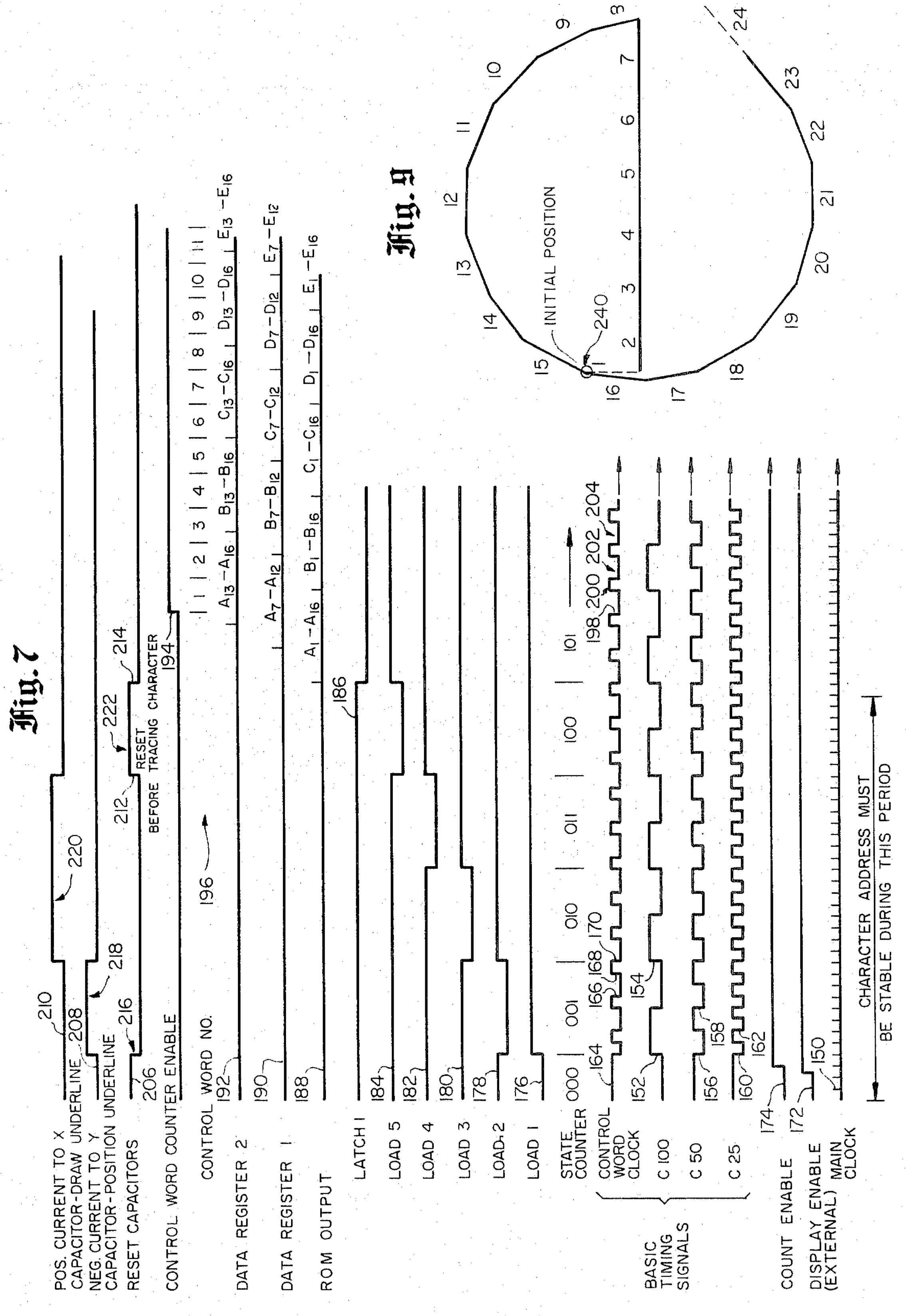
FIG. 7 shows graphs of several voltages plotted as a function of time illustrating the operation of the system.
FIGS. 8 and 9 graphically illustrate the creation of one particular character.

With reference now to FIG. 7, the system timing will be explained in detail. With any system there is a main clock generating a plurality of synchronous pulses 150 to provide the system timing requirement for all portions of the system. The main clock can be, for example, a crystal controlled oscillator having suitable pulse shaping means receiving its output for generating a synchronous series of pulses to provide the timing reference pulses. Several basic timing signals are derived from the main clock pulses using state of the art techniques. The timing signal C100 establishes a basic time period of one unit which is the time duration between the first positive going portion 152 of the pulse and the next positive going portion 154 of the pulse. Similarly, the C50 timing signal has a time duration one-half that of the C100 timing signal, the timing period being defined by the first negative going portion 156 of the pulse and the next negative going portion 158 of the pulse. The timing signal C25 has a time duration of one-quarter the C100 timing signal, that is, the timing period between the first negative going portion 160 of the pulse and the next negative going portion 162 of the pulse. A fourth timing signal or a control word clock signal 164 produces the timing signals on line 58 of FIG. 1 to the control logic 56. The control word clock signal 164 has unequal "on-off" times, that is, the "on" time between negative going leading edge 166 of the pulse and positive going edge 168 of the pulse is twice the duration of the time period between edge 168 and negative going edge 170, the pulse duration being between negative going edge 166 and negative going edge 170. The explanation of the timing diagram of FIG. 7 will proceed on the basis that a previous character has been completed and the system is in the process of displaying the next character. Also, the seven bit character address on the external source is present at input 28 to the control read-only memory 22 (see FIG. 5). For purposes of illustration, the display enable signal, which is externally applied, is shown on graph 172 although it is to be understood that this signal in the following illustration has already been applied. When the display enable signal 172 is applied to the system timing 26 a count enable signal 174 (the curve immediately above the display enable signal) is generated and locks into the main clock pulse 150 next following the application of the display enable signal 172. The horizontal column entitled "State Counter" is the digital information output sequentially available from the three bit counter 80 which is gated according to timing signal C100 through successive states. Also clocked to the C100 timing signal are the "load 1", "load 2", etc. enabling pulses which successively load the four bit words at output 84 of control read-only memory 22 (see FIG. 5) into the five four bit counters. Initially, "load 1" signal on curve 176 is already enabled (that is, the voltage level has gone "low"), the seven bit character address is available at input line 28 to the control read-only memory 22, and the three bit counter 80 is at its 0-0-0 state (to provide the initial 10 bits of address to the control read-only memory to address the first location of four bits output on line 84) which is then loaded into the first four bit counter 86. The "load 2" signal 178 then goes "low" simultaneously with "load 1" signal 176 ending. At this point in time the three bit counter is in state 0-0-1 which, along with the seven bits of character address on line 28, provides a second 10 bit address to the control read-only memory 22 for addressing the next four bits onto output 84 which is then loaded into the second four bit counter 88. The next three four bit counters are similarly sequentially loaded by the load signals 180, 182 and 184 as the three bit counter 80 advances through state 0-1-0, 0-1-1 and 1-0-0, respectively, to provide the next three 10 bit addresses to the control read-only memory 22. It is to be understood that during the duration of the loading process the character address at input 28 must remain stable during the time period required for the loading signals. At the conclusion of the "load 5" signal on curve 184 a "latch 1" signal is provided on curve 186 to provide an output from the character read-only memory 20 (see FIG. 1) at output 44 consisting of a 16 bit memory word identified as $A_1$–$A_{16}$ on curve 188 of FIG. 7. At a first predetermined time interval later, six bits of the memory word are latched into data register 1 on line 190 (identified as bits $A_7$–$A_{12}$), and at a second predetermined time interval later four bits of information are latched into data register 2 on line 192 (identified as bits $A_{13}$–$A_{16}$). The outputs of the read-only memory 20 and data registers 40 and 42 (represented by curves 188, 190 and 192) provide inputs to multiplexer 46 to produce six bit control words at output 54 thereof. At a preset time interval after the memory word is available a control word counter enable pulse 194 is generated, the duration of the pulse corresponding to the information received from the eight bit control word counter 30. Under the control of the control word clock signal 164 control words are generated as indicated on horizontal column 196 of FIG. 7 entitled "Control Word No." The distance between vertical lines is indicative of the control word timing pulse of its clock signal 164.

By comparing the vertical alignment of lines 188, 190, 192 and 196 it can be seen that the information necessary to successively generate the control words is present either in the read-only memory 20 or either of the data registers 40 and 42 at a given point in time. Since the multiplexer is a logical equivalent to a six pole, eight position switch, a comparison of the control word clock timing signal 164 shows that control word number 1 is gated to control logic 56 at negative going leading edge 198 of the control word clock pulse, the enabling action lasting two-thirds of a control word clock pulse cycle. During this time the multiplexer 46 transmits the first six bits of information, that is, $A_1$–$A_6$ to provide the first control word from the read-only memory output as indicated on line 188. During the next enabling cycle 202 of the control word clock signal, the next sequence of six bits is available only in data register 1 at line 190 corresponding to bits $A_7$–$A_{12}$ which form control word number two to the control logic 56. During the "off" cycle 200 of a control word clock signal, the control logic 56 commences performance of its function and the multiplexer 46 advances its state to transmit the next six bits of information.

During the next enabling cycle 204 of control word clock signal 164, the next six bits of information to form control word number three are transmitted through multiplexer 46, that is, bits $A_{13}$–$A_{16}$ from data register number two on line 192 plus bits $B_1$ and $B_2$ from the read-only memory output on line 188. Successive control words are then produced in sequential fashion in a similar manner to generate the character in question. In the multiplexer 46 a complete multiplexing cycle produces eight control words of six bits each from only three memory words of sixteen bits each. Thus it can be seen by the utilization of a separate control read-only memory 22 and by the utilization of one address in the character read-only memory to derive memory words capable of producing a plurality of successive control words by means of the multiplexer 46 and the data registers 40 and 42 extremely efficient usage of the character read-only memory 20 is possible. Furthermore, the speed of generation of control words is at a much faster rate than the words from memory. Thus, the character generation is not limited by the speed of the character read-only memory 20.

An additional function is possible in the system as will be explained with reference to curves 206, 208 and 210 of FIG. 7. Curve 206 illustrates the enabling signal for discharging capacitor 108 (see FIG. 6) through transistor 134 at the conclusion of each character generating cycle. The "reset" signal occurs in synchronism with the C100 timing signal and lasts for one pulse duration just prior to the enabling signal for the read-only memory output on line 188. This "reset" is defined as a positive going pulse between lines 212 and 214 of the "reset" signal 206. The capacitor 108 is discharged prior to the tracing of each character. Curves 208 and 210 illustrate the timing for an additional signal which can be applied prior to character generation to underline the character being generated. This can be hard wired into the system to sequentially provide a reset pulse 216 for discharging capacitor 108, an enabling pulse 218 as indicated on curve 208 to position the electron beam for underlining by applying a negative current to the capacitor 108 associated with the Y-axis deflection circuitry and a second enabling pulse 220 as shown on curve 210 to visibly trace the underline for a predetermined time duration by applying positive current to the capacitor 108 associated with the X-axis deflection circuitry. Both capacitors 108 are then reset by pulse 222 of curve 206 just prior to generation of the character in question. (This is shown in FIGS. 10 *a*–10*c*).

Figure 8:
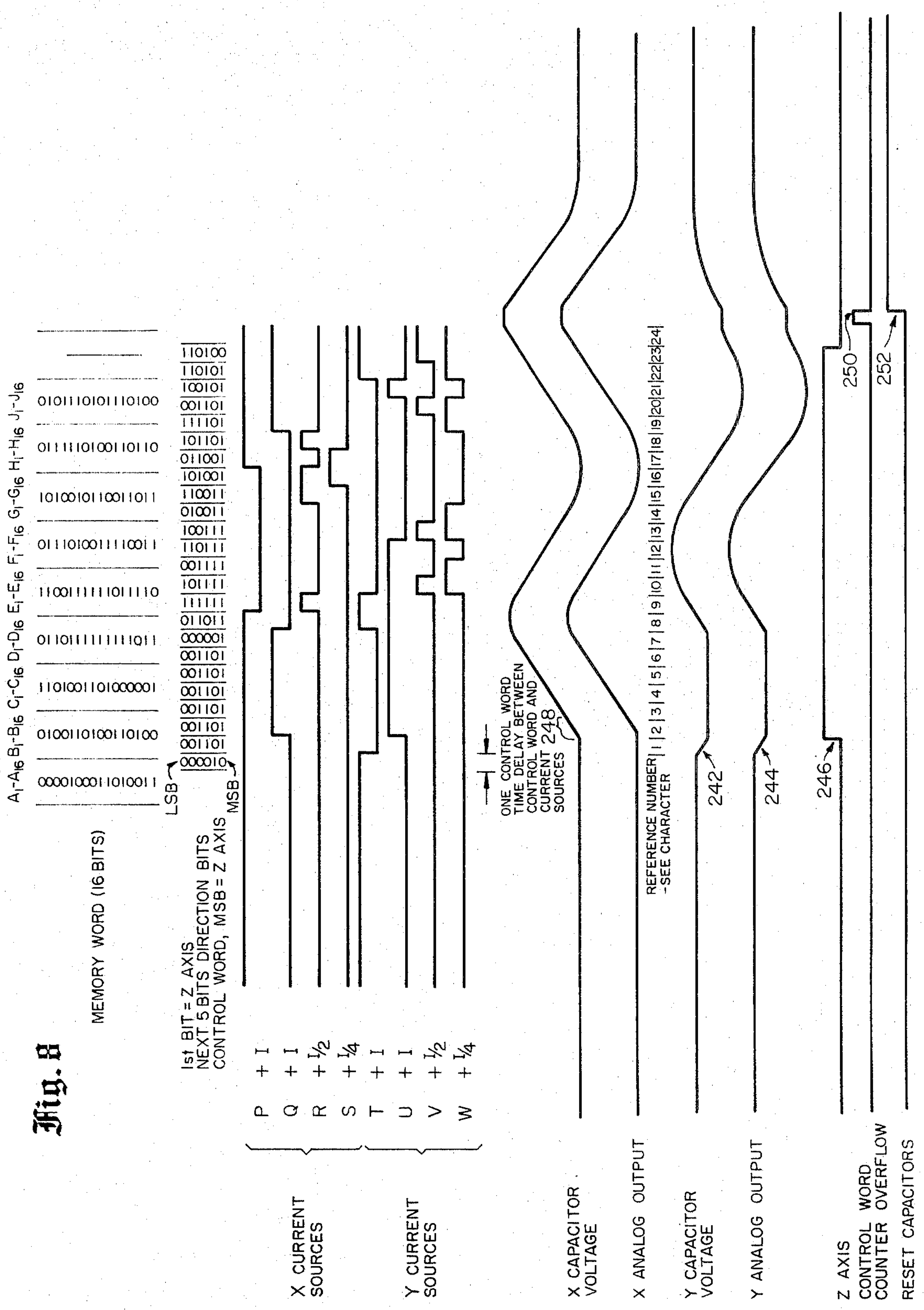

A specific example of a character being generated will now be discussed with reference to FIG. 8 which illustrates the timing and the outputs required to generate the character *e* as shown in FIG. 9. As shown in the table of FIG. 4, this particular character requires 24 strokes with six bits of control word required per stroke. The 24 strokes necessary will be sequentially analyzed with respect to FIG. 8 with reference to the nine 16 bit memory words used to produce the 24 control words. The character *e* is depicted in FIG. 9 showing the twenty-four strokes necessary to generate the character with dotted lines indicating beam positioning with no visible traces while the solid lines depict the visible trace produced on the display surface 12 of cathode ray tube 10 (see FIG. 1). The uppermost horizontal column in FIG. 8 shows the information present in each successive 16 bit memory word with the vertical lines associated with each group (i.e., $A_1$–$A_{16}$) depicting the time duration during which the memory word is available from memory. The next horizontal column entitled "control word" shows the digital information used to produce each successive control word of the 24 successive control words necessary to generate the character *e.* The vertical lines encompassing each digitally coded control word is indicative of the time duration for that particular control word. In the control word column, the least significant bit is the uppermost bit when viewed vertically while the most significant bit is the bottom bit representative of the Z-axis information. The first four graphs (as viewed from top to bottom) represent the input to the X-axis current sources of FIG. 6, that is, the input signals P, Q, R and S, each of which represents the unit or fractional value of positive current associated therewith (i.e., +I, +I, +I/2 and +I/4, respectively). Similarly, the next four curves represent the input signals to the Y-axis current sources similar to that shown in FIG. 6 where the input signals would be T, U, V and W with the associated unit and fractional current values.

The next two curves are indicative of the voltage build-up on capacitor 108 of FIG. 6 where the X-axis component which provides the input at line 68 to the low pass filter 72 and the X-axis analog output which is the output of the low pass filter 72. Similarly, the next two curves show the capacitor voltage where the capacitor associated with the Y-axis current sources 66 and the Y-axis analog output from low pass filter 74. The next curve entitled "Z-axis" illustrates the energized state of the electron beam in response to the control words in the second horizontal column. The next curve entitled "control word counter overflow" illustrates the signal generated from the control word counter 30 (see FIG. 1) to signal to the system timing 26 that the character is complete. The last curve entitled "reset capacitors" illustrates the signal generated and applied to transistor 134 (see FIG. 6) at the end of the character generation cycle. With respect to FIG. 9, the numbers associated with each stroke generating sequence are reproduced on a time scale immediately below the curve entitled "X analog output."

With the time periods increasing from left to right as viewed in FIG. 8, at one point in time a 16 bit memory word is available from the character read-only memory 20 which has portions thereof suitably latched into data registers 40 and 42 as previously discussed, the outputs of which are multiplexed by multiplexer 46 to produce a succession of control words as shown in the second horizontal column starting at a predetermined time period later. The first six bits reading from top to bottom of the first memory word correspond to the six bits of the first control word reading from top to bottom, while the next six bits, i.e., $A_7$–$A_{12}$ of the memory word reading again from the top to bottom form the next six bit control word. The last four bits of the first memory word plus the first two bits of the next memory word, reading again from top to bottom (i.e., $A_{13}$–$A_{16}$, $B_1$, $B_2$) form the third control word. Successive control words are similarly produced from the memory words as previously described. It should also be remembered that the control word information is provided to the control logic 56 which in turn generates digital information of four bits each at outputs 60 and 62 for the X and Y axes respectively.

In the following analysis there is a time delay between the control word interval or the control word horizontal column and the current source inputs (represented by the first eight curves) of one control word time duration. Consequently, the curves representative of the current sources are time phase shifted to the right one control word time duration pulse.

With the first control word having the digital information 01000, the first bit of information would indicate an "off" condition for the electron beam while the next five digits would indicate the direction that the beam was to be moved from its initial position 240 on FIG. 9. This would represent a "16" stroke as shown in FIG. 2 which by reference to FIG. 3 for the "16" direction would generate the X and Y digital information associated therewith. This would mean for the X-axis the P input would be "one" and the Q, R and S inputs would be "zero", thereby resulting in a logic control signal being applied to input P of the X current source circuit (FIG. 6). In the eight curves shown for the X and Y current sources inputs P and T are initially "high" to provide a positive unit of charging current to capacitor 108 which is required to offset the constant negative unit of current continually supplied to the capacitor 108 to provide a zero net current charge at the commencement of character generation. Consequently, for the first control word to generate the character *e* the control signal applied to the P input remains high while the control signal applied to the T input is removed to permit deflection of the beam along the dotted line numbered 1 as shown in FIG. 9. This is caused by a net zero charging current to the capacitor 108 associated with the X-axis and a charging current of –I to the Y-axis (that is, no input signals resulting in the constant negative unit value current charging the associated capacitor 108).

For the next control word 101101 the most significant bit would energize the Z-axis as shown in the associated curve of FIG. 8 for visibly tracing the stroke corresponding to the control word. The five remaining bits of information would indicate a number 12 stroke (FIG. 2) which, as shown in the table of FIG. 3, would produce high logic control signals at inputs P, Q and U with zero inputs to the balance of the X and Y current source inputs. Consequently, when viewing the curves of FIG. 8, input P would remain high, input Q would receive a high logic control signal, inputs R, S and T would remain at their low state, input U would receive a high logic control signal while inputs V and W would remain at their low state to generate the trace "2" on FIG. 9 which would be visibly displayed.

Correlating these first two control words to the capacitor voltage and analog output curves during the time interval corresponding to the tracing of the stroke numbered "1" the X capacitor voltage remains zero as does the X analog output. The Y capacitor voltage starts to build up as shown at 242 based on the negative unit charging current applied thereto with the Y analog output at 244 being similar thereto with the exception of the smoothing of the curve by the low pass filter 74 associated therewith. At the end of trace one the Z-axis is energized as indicated at 236, the combined Y-axis net charging current to capacitor 108 is zero, thereby resulting in capacitor 108 maintaining the negative charge level applied thereto, while a positive unit value of charging current is applied to the capacitor 108 associated with the X-axis current source 64 thereby resulting in a positive voltage build-up on capacitor 108 as indicated at 248, thereby moving the electron beam (visibly traced) along trace number "2" of FIG. 9, that is, in a horizontal direction to the right. Control words three, four, five, six and seven are identical to the second control word thereby resulting in a continual visible trace horizontally to the right as viewed in FIG. 9 for the duration of the control words. Similarly, during the time period the X-axis capacitor voltage continues to build up at the same rate based on a positive unit value charging current, while the Y-axis capacitor voltage remains constant. Next in sequence in control word number eight containing digital information 100000 which is a vertically directed stroke numbered "00" on FIG. 2 which, as can be seen in the table of FIG. 3, correlates to a high logic control signal at inputs P, T and U to provide a net charging current of zero to capacitor 108 associated with the X-axis and a net positive charging current of unit value of capacitor 108 associated with the Y-axis. As can be seen in FIG. 8, input P remains high, input Q reverts to its low state, input R remains low, input S remains low for the X-axis current sources. For the Y-axis current sources, input T goes high, input U remains high, while inputs V and W remain low. Consequently, the X-axis capacitor 108 voltage remains at the level previously reached while the Y-axis capacitor 108 voltage starts to build up under the value of the positive unit current value of charging current from its previously negative charged value. The net result is a control signal at 252 to reset the capacitors by triggering transistor 134 (of FIG. 6) to discharge capacitor 108 at the end of the character display cycle.

Figures 10A, 10B, 10C:
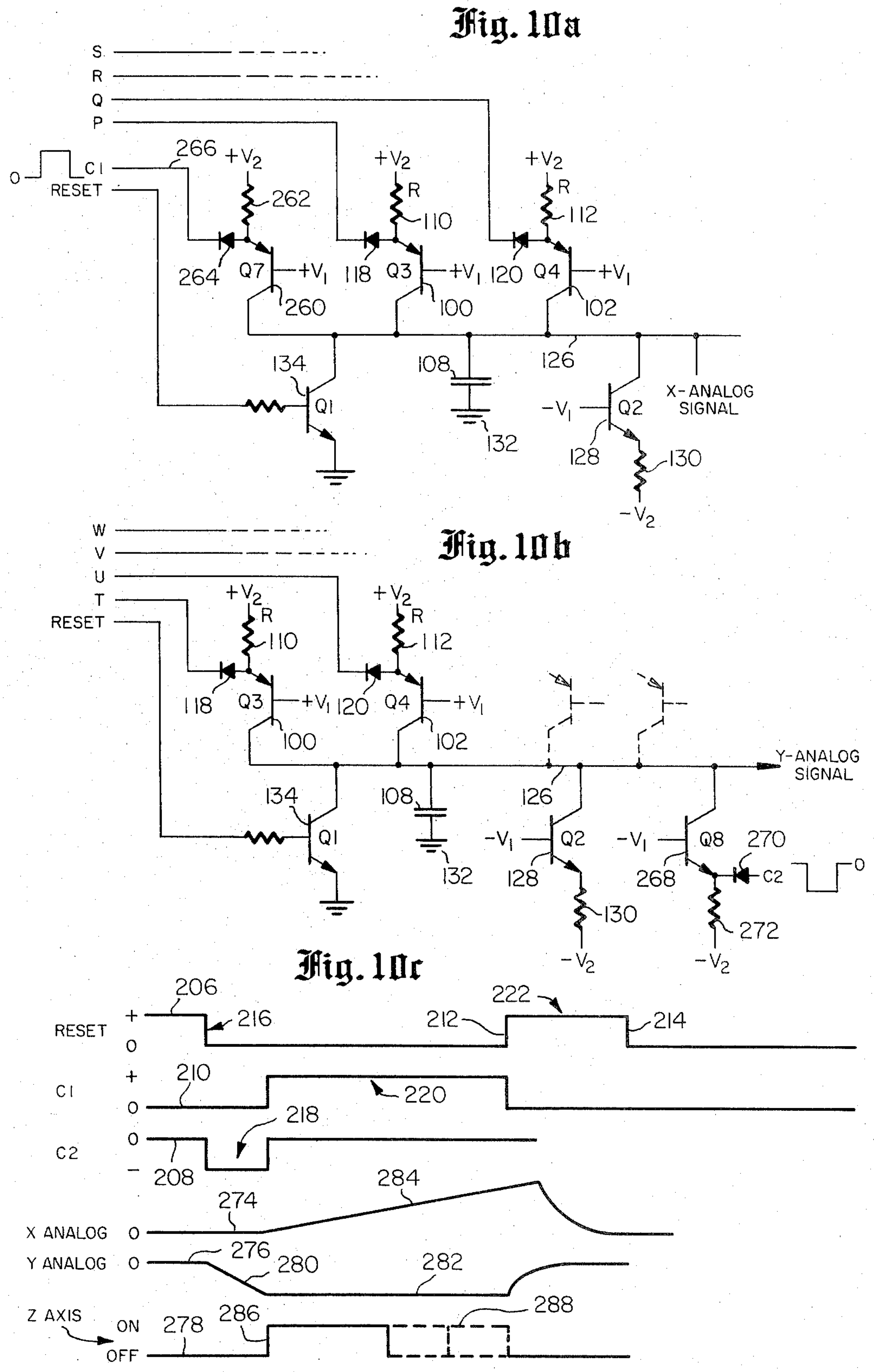
FIGS. 10*a* – 10*c* schematically and diagrammatically illustrate underlining a character.

Referring now to FIGS. 10*a*–10*c* details pertaining to the underlining of a given character will now be discussed. As previously discussed with reference to FIG. 6 the current sources and capacitor 64 and 66 for the X and Y axes, respectively, are identical in configuration. However, in order to provide the underline capability previously discussed with reference to curves 208 and 210 of FIG. 7 the circuitry of FIG. 6 is modified as shown in FIG. 10*a* for the X-axis deflection. In this FIG. (10a) all the pertinent portions that are identical bear the same numbering of elements. An additional current switch is provided by transistor 260 which has the base thereof suitably coupled to a positive voltage source while the emitter is suitably biased through resistor 262 to a second voltage source $+V_2$. The emitter of transistor 260 has the anode of a diode 264 connected thereto while the cathode of the diode receives an input signal on line 266 designated C 1. In the initial condition with no C 1 (positive going pulse) signal present on line 266 the diode 264 is forward biased and the base — emitter junction of transistor 260 is reversed biased so that the current flow from the collector thereof is zero. If a control signal C 1 is applied on lead 266 then diode 264 is reversed biased and carries no current. Transistor 260 then has an emitter current, the value of which is determined by the value of the resistor 262 and the value of the voltages $+V_1$ and $+V_2$ and the base-emitter voltage of transistor 260. This thereby provides a charging current to capacitor 108 which off sets the negative charging current of transistor 128 as previously discussed.

With respect to the Y-axis deflection circuitry the circuit of FIG. 6 is modified as shown in FIG. 10*b*. Corresponding components are similarly numbered as in FIG. 6, the only exception being that the logic control signals are designated T, U, V and W, to correspond with the Y inputs shown in FIG. 3. In the circuitry of FIG. 10*b* an NPN transistor 268 is connected in parallel with transistor 128 to provide an additional current source which is switchable. The base of transistor 268 is suitably coupled to a negative voltage source $-V_1$ while the emitter is suitably biased to a second negative voltage source $-V_2$ through a current limiting resistor 272, the value of which determines the amount of charging current to capacitor 108 when transistor 268 is rendered conductive. Also coupled to the emitter of transistor 268 is the cathode of a diode 270, the anode thereof being adapted for receiving a second control signal C 2 (a negative going pulse).

As previously discussed transistor 128 provides a constant current of negative polarity to capacitor 108 so that the initial charge on capacitor 108 is provided by negative current. With no control signal C 2, transistor 268 is non-conductive and with no other logic control signals applied at inputs T, U, V and W, the net charging current to capacitor 108 is the negative net current provided by transistor 128. When logic control signal C 2 is applied transistor 268 is switched to its conductive state thereby providing a larger value of negative net charging current to capacitor 108, the total value of which is determined by the value of current limiting resistor 272.

FIG. 10*c* illustrates the timing and the outputs for generating an underline prior to generation of a character in the manner previously discussed. Curve 206, 208 and 210 are herein reproduced from FIG. 7 with curve 208 being designated C 2 to correspond to the control signal input of FIG. 10b, this curve being reversed to show the application of the negative current to the Y-axis capacitor to position the electron beam for underlining. Curve 210 is herein designated C 1 to correspond to the control signal of FIG. 10a which provides positive current to the X-axis capacitor to draw the underline. Curves 274, 276 and 278 illustrate the X-analog, Y-analog, and Z-axis curves respectively, in time relation to the reset and control signals.

If the character to be generated is to be underlined, the underline information appears first to apply a "reset" pulse to transistor 134 to discharge the capacitors 108 of both the X-axis and Y-axis deflection circuits. Initially the Z-axis is "off" as illustrated on curve 278. In order to position the underline with respect to the character to be generated control signal C 2 is applied rendering transistor 268 conductive as previously discussed resulting in a combined cumulative negative charging current from both transistors 128 and 268 thereby resulting in the Y capacitor 108 voltage building up as shown at portion 280 of curve 276. When control signal C 2 is terminated as shown by the positive going edge of pulse 218 the capacitor 108 maintains the negative charge level applied thereto as indicated by portion 282 of curve 276. Upon the cessation of control signal C 2, control signal C 1 is applied to transistor 260 (FIG. 10*a*) to provide a positive charging current to capacitor 108 of the X-axis circuitry to offset the initial negative charging current of transistor 128. The X capacitor voltage starts to build up as shown at portion 284 of curve 274 to thereby draw the underline which is visibly traced on the display screen by energization of the Z-axis as shown at positive going edge 286 of curve 278, this occurring simultaneously with the application of control signal C 1. The length of the underline on the display screen is determined by the time duration the Z-axis remains in its "on" condition. Dotted line portion 288 of curve 278 illustrates fiferent "turn off" times of the Z-axis. If proportional spacing is employed the time duration of energization of the Z-axis will be determined by the width of the character being underlined. At the conclusion of the underline of desired length control signal C 1 is terminated and reset pulse 222 is applied to discharge both capacitor 108 prior to tracing of the character as previously discussed.

Accordingly, it can be seen by the utilization of the display system hereinabove described existing fonts may be emulated with high resolution. Also, arbitrary characters may be produced, such as mathematical symbols, foreign alphabets or typesetting fonts. Additionally, while the Z-axis has been designated as an "on-off" situation, data compression could be applied to the Z-axis information if desired. Furthermore, while not shown, it is also to be understood that for a display system capable of displaying many characters gross positioning means would also be included in such circuitry.

While there has been shown and described a preferred embodiment according to the invention, it is to be understood that various direction assignments, digital information assignments, memory word length and control word length are not intended to be limiting but merely illustrative of the preferred embodiment.

What is claimed is:

1. In a display system for forming a character on a display screen by sequentially generating a plurality of strokes, each of the strokes having a length and direction determined by a control word, with different characters having differing numbers of control words utilized for the formation of the character, the combination comprising:

input means for receiving an input signal indicative of the character to be formed;

a character memory comprising a plurality of memory word storage locations for storing memory words of a predetermined bit length, said predetermined bit length being less than the total bit length of the control words utilized for the formation of at least a portion of the characters which can be displayed by said display system;

a control memory responsive to said input signal for deriving a first group of data indicative of the number of control words used to form the selected character and a second group of data indicative of the beginning address in said character memory of memory words indicative of the control words which define the character to be formed;

means responsive to said second group of data for sequentially addressing locations in said character memory to successively provide output memory words from said character memory;

means accepting said memory words and deriving control words therefrom;

means responsive to said control words for sequentially generating strokes on the display screen to form the character; and means responsive to said first group of data for indicating the occurrance of the number of control words needed to define the character to be formed.

2. The combination according to claim 1 wherein said means accepting said memory words includes at least one data register and a multiplexer, said data register accepting a portion of each memory word, the multiplexer selectively transferring data from said character memory and said data register to create the control words.

3. The combination according to claim 2 wherein said means for sequentially generating strokes includes control logic responsive to said control words for generating deflection signals and signals for unblanking the display screen.

4. The combination according to claim 1 wherein said means responsive to said second group of data includes an address counter which provides a starting memory address to the character memory and said character memory then sequentially provides the memory words for the character to be formed.

5. The combination according to claim 3 wherein the display screen has an electron beam and said control logic includes a decoder for decoding the control words to provide a first set of digital information for controlling the X-axis deflection of the electron beam, a second set of digital information for controlling the Y-axis deflection of the electron beam and a single bit of information for controlling the ON-OFF state of the electron beam.

6. The combination according to claim 5 wherein said means for sequentially generating strokes further includes a first and second capacitors, each of which produces a voltage ramp of unique slope in response to said first and second sets of digital information, respectively, to deflect the electron beam.

7. The combination according to claim 6 wherein each of said first and second sets of digital information provides a charging current to each of said first and second capacitors, respectively, the magnitude of the charging current being determined by the information present in each set and the cumulative charge on the capacitor being determined by the net charging current previously applied to the capacitor by preceding sets of digital information.

8. The combination according to claim 5 wherein said means for sequentially generating strokes further includes a first and second capacitors, and a first and second sets of current sources to provide a first and second charging current to said first and second capacitors, respectively, in response to said first and second sets of digital information.

9. The combination according to claim 8 wherein each of said sets of current sources includes one continually conductive current source, the other current sources each having an input for receiving one bit of the digital information of the respective set of digital information and each being rendered conductive in response to one state of said input.

10. The combination according to claim 9 wherein said one continually conductive current source provides a negative net charging current to said capacitor and the other current sources provide positive charging current to said capacitor whereby the cumulative charging current is the algebraic sum thereof.

11. The combination according to claim 7 wherein each of said first and second capacitors is provided with a selectively actuable discharge path.

* * * * *